(12) United States Patent
Wrenn

(10) Patent No.: US 6,847,647 B1
(45) Date of Patent: Jan. 25, 2005

(54) METHOD AND APPARATUS FOR DISTRIBUTING TRAFFIC OVER MULTIPLE SWITCHED FIBER CHANNEL ROUTES

(75) Inventor: Richard Fitzhugh Wrenn, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 752 days.

(21) Appl. No.: 09/669,396

(22) Filed: Sep. 26, 2000

(51) Int. Cl.[7] ............................................. H04L 12/28
(52) U.S. Cl. ................... 370/395.32; 370/392; 711/216
(58) Field of Search .............................. 370/230, 235, 370/238.1, 389, 392, 394, 395.3, 395.31, 395.32, 238; 711/216

(56) References Cited

U.S. PATENT DOCUMENTS

| | | | |
|---|---|---|---|
| 5,592,472 A | 1/1997 | Grant et al. | 370/351 |
| 6,310,881 B1 * | 10/2001 | Zikan et al. | 370/401 |
| 6,401,128 B1 * | 6/2002 | Stai et al. | 709/236 |

OTHER PUBLICATIONS

American National Standard for Information Technology, Fiber Channel: Switch Fabric (FC–SW) rev 3.3, Oct. 1997.*
American National Standard for Information Systems, Fiber Channel: Physical and Signalling Interface–2 (FC–PH–2) rev 7.4, Sep. 1996.*

* cited by examiner

Primary Examiner—David E. Odland

(57) ABSTRACT

A computer network has two or more switches and a plurality of links. A first machine and a second machine are interconnected by the network in such a way that there exist multiple paths through the network from an N_Port of the first machine to an N_Port of the second machine. Network traffic from the N_Port of the first machine to the N_Port of the second machine is distributed between the multiple paths such that frames related to any single exchange traverse the same path yet frames of a first exchange need not traverse the same path as frames of a second exchange. Frames of each exchange therefore tend to be received by their destination in order with respect to other frames of that exchange, while they are not necessarily received in-order with respect to frames of other exchanges.

16 Claims, 5 Drawing Sheets

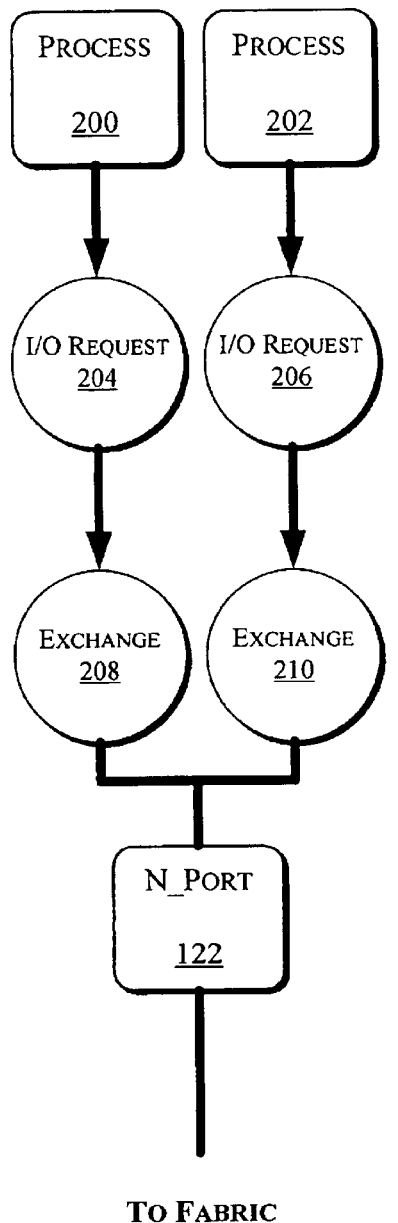
*FIGURE 1A*
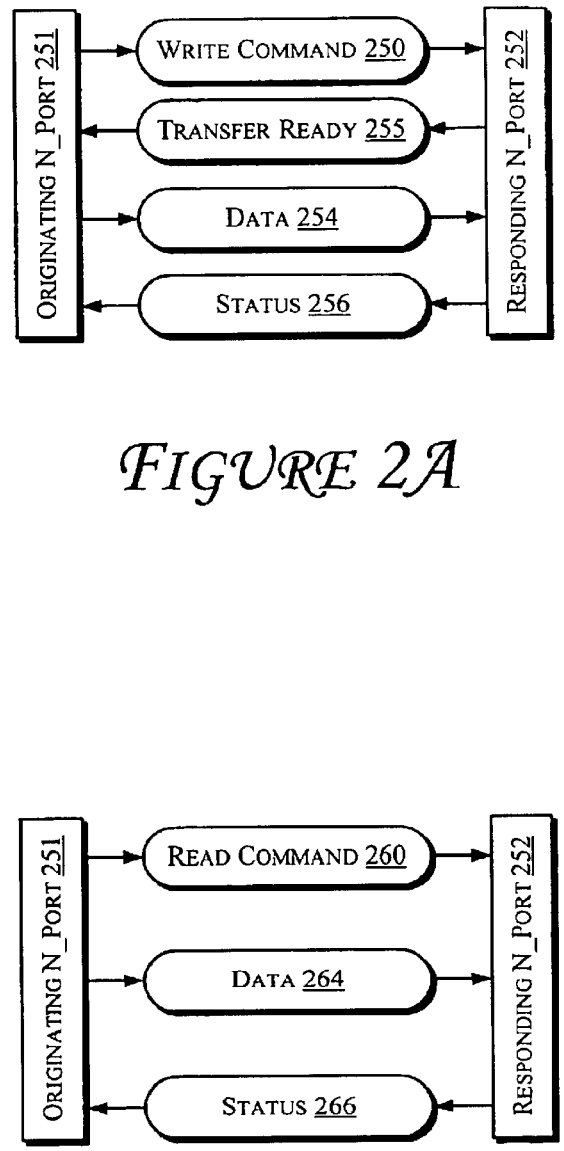
*FIGURE 2A*
*FIGURE 2B*
SIMPLE EXCHANGE
SEQUENCES

PACKET STRUCTURE

METHOD AND APPARATUS FOR DISTRIBUTING TRAFFIC OVER MULTIPLE SWITCHED FIBER CHANNEL ROUTES

FIELD OF THE INVENTION

The invention relates to the field of computer networks. In particular, the invention relates to distributing network traffic between a pair of networked machines over multiple available routes through a network interconnecting the machines.

NATURE OF THE PROBLEM

Most modern computer networks, including switched Fibre Channel networks, are packet oriented. In these networks, data transmitted between machines is divided into chunks of size no greater than a predetermined maximum. Each chunk is typically packaged with a header and a trailer into a packet for transmission. In Fibre Channel networks, packets are known as Frames.

Packets encounter delay while being routed through a network. Many networks have switches or routers that receive packets, store them, and forward the packets on towards their destinations when communications resources become available; storing and forwarding of packets introduces delay. Additional delay may be caused by propagation delay in the network interconnect between machines or switches of the network.

The multiple packets, or frames, associated with a single Fibre Channel operation are known as a exchange. A Sequence is a group of one or more frames, forming part of an exchange, transmitted in a single direction over the network. A sequence may contain data, status, or control information. Each exchange may contain one or more sequences, and may contain data sequences of multiple frames with control and acknowledgment sequences that are often single frames. A Fibre Channel network having at least one switch is a switched Fibre Channel fabric. A Fibre Channel switch is a routing device generally capable of receiving frames, storing them, decoding destination information from headers, and forwarding them to their destination or to another switch further along a path toward their destination.

A network interface of a switch for connection of the switch to a machine is known as an F_Port. An F_Port having the ability to connect to a Fibre Channel Arbitrated Loop is known as an FL_Port. An E_Port is a network interface of a switch for connection of that switch to another switch of a fabric. A G_Port is a port having the ability to operate as either an F_Port or an E_Port; and a GL_Port further has the ability to connect to a Fibre Channel Arbitrated Loop. For purposes of this patent F_Port includes any port of a switch that connects through a link to a machine, whether it be an F_Port, G_Port, GL_Port, or an FL_Port. Further, for purposes of this patent, an E_Port includes any port of a switch that connects through a link to another switch, regardless of whether it be an E_Port, GL_Port, or G_Port. Further, for purposes of this patent, the term switch port includes any port of a switch, whether it be an E_port or F_port as defined herein.

A network interface for connection of a machine to a Fibre Channel fabric is known as an N_Port, and a machine attached to a Fibre Channel network is known as a node. An L_Port is a network interface for connection of a machine to a Fibre Channel Arbitrated Loop, and an NL_Port is an N_Port also having the ability to connect to a Fibre Channel Arbitrated Loop. For purposes of this patent, the term N_Port includes both N_Ports and NL_Ports.

Machines, or "Nodes", attached to a Fibre Channel network may be computers, or may be storage devices such as RAID systems, disk drives, or other storage servers.

A Fibre Channel exchange operates between an originator N_Port and a responder N_Port. For example, an originator N_Port may request an I/O operation such as a disk write; the machine attached to the responder N_Port performs the operation. N_Ports may be originators for some exchanges, and responders for others. Each Fibre Channel N_Port is assigned identification for use as a destination address for frames intended for it, this identification is unique to the specific Fibre Channel network at a given time. Each Fibre Channel N_Port participating in an exchange assigns exchange identification to that exchange, that exchange identification being unique among the exchanges in progress on that N_Port but not necessarily unique across the network.

For purposes of this application, a link is the data transmission and reception hardware and any associated firmware that form a connection between an N_Port and an F_Port of a switch, or between E_Ports of two switches, of a Fibre Channel fabric. A link may incorporate a Fibre Channel Arbitrated Loop.

In a computer network, there may be more than one possible path, or sequence of links, switches, hubs, routers, etc. that may be traversed by a frame, between two machines attached to the network. Multiple paths may be intentional, providing extra capacity or redundant paths to protect against switch, node, or line failures, or may be unintentional consequences of network topology. Multiple paths between a pair of N_Ports may exist if there are two or more switches in the network.

It is known that frames routed on different paths through a network may suffer different delays. Further, delay on each path varies with traffic on each link of the path, the arbitration sequence of each arbitrated loop forming part of a link, flow control delays like those often injected to avoid buffer overflow, and switch loading.

Machines transmitting data on modern high-speed networks usually do not wait for each frame to be acknowledged before transmitting following frames multiple frames of a single Fibre Channel sequence may exist in a Fibre Channel fabric at the same time. Further, frames of multiple sequences of a single exchange may also exist simultaneously in a Fibre Channel fabric, as may frames of multiple exchanges originated by any given N_Port.

If frames of a sequence are transmitted on different paths through a fabric, an early-transmitted frame suffering long delay on one path may arrive at its destination after a late-transmitted frame that suffers little delay on another path. Frames transmitted on different paths thus may arrive at the destination N_Port out-of-order, meaning that they are received in a different order than they were transmitted by their originating machine.

Frames received out-of-order may, and often do, require collection and sorting into correct order before they can be fully processed by the receiving machine. Some network protocols, including the TCP Internet protocol, presume out-of-order delivery and require that receiving machines collect and re-order frames before executing any command associated with them. Other order-dependent protocols, including the FCP protocol for encapsulating the SCSI storage interface protocol over Fibre Channel, assume that frames arrive in correct order—requiring that the Fibre Channel fabric deliver frames in-order. Some order-dependent protocols detect, and permit retry of, out-of-order frames even if they do not require that destinations perform resequencing. Fibre Channel frame headers include a sequence count field with which out-of-order frames may be detected within a sequence.

Fibre Channel fabrics support a variety of order-dependent and order-independent protocols running on top of their low-level Fibre Channel mechanism.

Since frames transmitted over the same path through a network tend to arrive in order, many Fibre Channel systems permitting order-dependent protocols restrict communication between any two N_Ports to transmission over one active path in each direction. Any other path between the N_Ports may be usable as an alternate path should an active path fail, but may remain little used until that failure occurs. Networks that failover from an active path to an is alternate path are known in the art of Fibre Channel networks. Frame routing of this type is known herein as static routing with alternate paths.

Links of an active path, especially links between switches, may be shared with traffic between other N_Ports, including N_Ports of other machines. As loads and network configurations change, it is possible for a statically routed active path to become a bottleneck while alternate paths may have unused capacity. It is desirable to make use of any available, otherwise unused, capacity of these alternate paths to provide improved network throughput.

It is known that many machines, including RAID storage subsystems, have the ability to queue multiple commands for execution. For example, a RAID system may queue several read or write commands, received from one or more machines. Once queued, these commands are executed from the queue to or from cache, or to or from disk, in an order depending on availability of data in cache, disk availability and disk rotation. With proper interlocks, execution may often be in an order different from that in which the commands were received.

Commands that may be queued in these devices may include commands from multiple processes, or threads, running on a single machine having one or more processors. For example, a transaction-processing system may have several processes running, each process requiring access to a different record of a database on a RAID system, all requesting access to the database at about the same time. Each process may then create read, write, lock, or unlock commands for the database. Queuing and execution of each of these commands requires that a exchange of frames be transmitted between the machine and the device.

Fibre channel frame headers have a D_ID field that encodes identification of the destination N_Port of the frame. They also have an S_ID field that encodes identification of the originating port of the frame. There is also an OX_ID field that encodes the exchange identifier assigned by the originating N_Port, and an RX_ID field that encodes the exchange identifier assigned by the receiving N_Port of the exchange. Since the receiving N_Port does not assign RX_ID until the exchange has begun and a frame is sent in response to other frames of the exchange, the RX_ID field of early frames of an exchange, including the first frame sent by the originating N_Port, may not match the RX_ID of late frames of the exchange.

SOLUTION TO THE PROBLEM

A network, such as a Fibre Channel fabric, having two or more machines attached, each attached to the fabric through at least one N_Port, has a first and a second path between an N_Port of a first machine and an N_Port of a second machine. The first machine originates several commands for execution on the second machine and embeds those commands and associated data in frames. Frames belonging to a first command are recognized and transmitted between the first and second machines over the first path, while frames belonging to a second command are transmitted between the first and second machines over the second path.

Frames belonging to an individual exchange are recognized through the OX_ID field of the frame headers. In an alternative embodiment, frames belonging to an individual exchange are recognized through a combination of the OX_ID and the S_ID fields of the frame headers. These fields, together with the destination address (D_ID) of the frame, are input to a function whose output is used by routing and distributing tasks of one or more switches to index routing tables at a switch of the network fabric. These routing tables contain information determining the link over which each frame will be sent through the fabric from that switch towards the destination. In this way, the routing tables determine paths, from what may be a multiplicity of possible paths, that each frame will follow through the network.

Except when routing tables are being updated, frames relating to the same exchange therefore follow the same path through the network, and therefore arrive in-order. Frames of simultaneous, but different, exchanges may be routed over different paths thus distributing traffic between the available paths.

As nodes, switches, and links are added to or removed from the network, and as a load-balancer adjusts demand on elements of the network, the routing tables are updated to reflect valid paths through the network and desired frame distribution among them. If more than one valid path appears in the table for any given destination, commands to that destination will tend to be distributed between the paths according to the frequency with which each path appears in the table.

BRIEF DESCRIPTION OF THE DRAWINGS

FIG. 1A, an illustration of multiple processes causing overlapping exchanges on an N_Port;

FIG. 2A, an example of frames for a simple write exchange;

FIG. 2B, an example of frames for a simple read exchange;

DETAILED DESCRIPTION OF THE ILLUSTRATED EMBODIMENT

Figure 1:
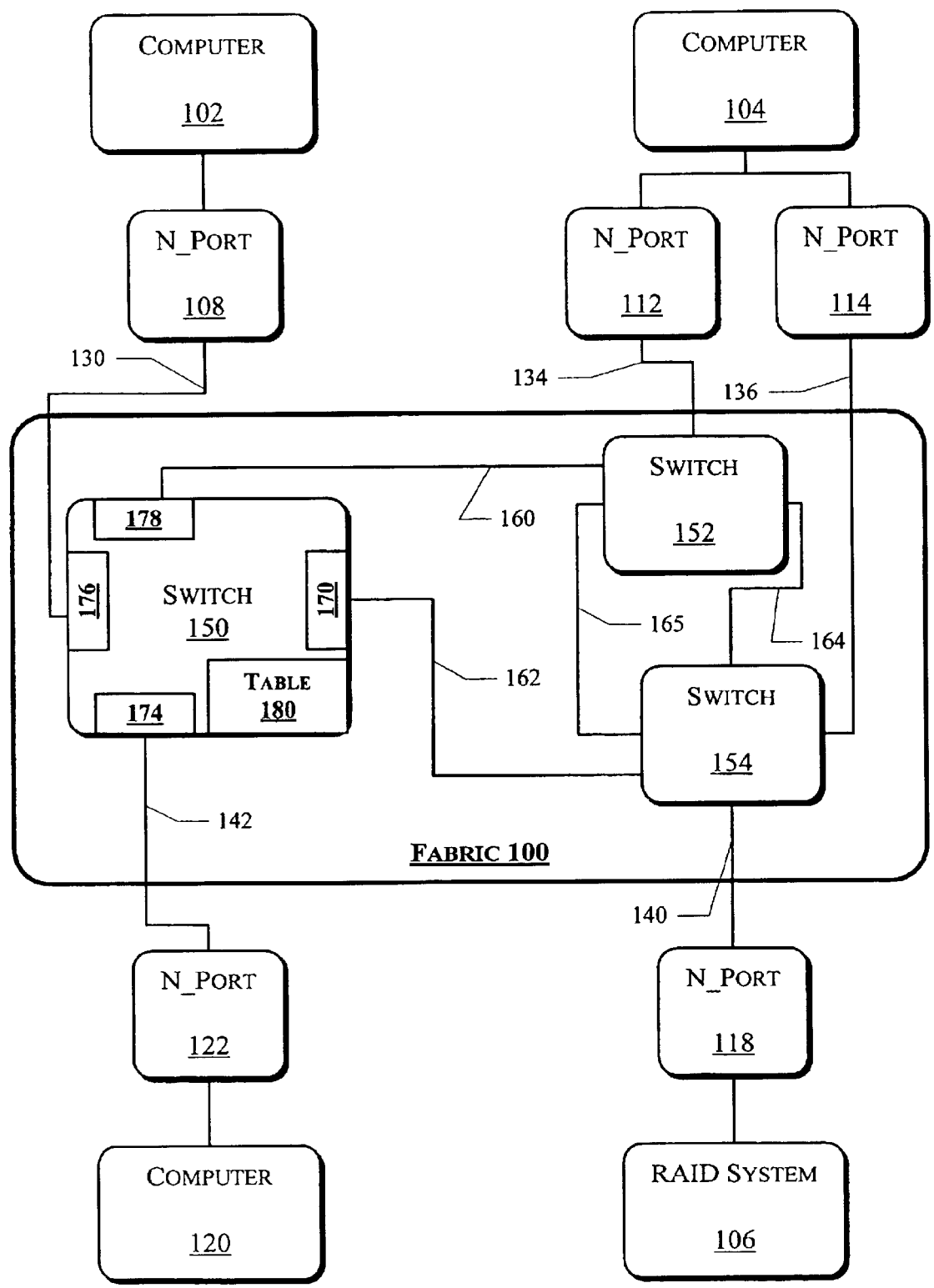
FIG. 1 is an illustration of a Fibre Channel network having several machines and several paths between some of these nodes.

A switched Fibre Channel network (FIG. 1) has at least two machines, with a switched Fibre Channel fabric 100 interconnecting them. The fabric may incorporate two or more switches.

Machines of the network may include computers 102 104, and 120, and RAID or other storage systems 106 each having at least one N_Port 108, 112, 114, 118, and 122, for interconnection to the fabric. Each N_Port 108, 112, 114, 118, and 122 connects through a link 130, 134, 136, 140, and 142 to a switch of the switches 150, 152, and 154 of the fabric 100. Switches 150, 152, and 154 of the fabric may further be interconnected by additional links 160, 162, and 164. Switches of the fabric may be joined by multiple links, switch 152 connects to switch 154 by a redundant link 165.

There may be, and preferably are, more than one path between a first and a second machine of the network. There are frequently also more than one possible path from a first N_Port to a second N_Port. For example, computer 120 may communicate to RAID system 106 through a first path comprising N_Port 122, link 142, switch 150, link 162, switch 154, link 140, and N_Port 118; or through a second path comprising N_Port 122, link 142, switch 150, link 160, switch 152, link 164, switch 154, link 140, and N_Port 118. A third path may also exist similar to the second path but using the redundant link 165 from switch 152 to switch 154, comprising N_Port 122, link 142, switch 150, link 160, switch 152, link 165, switch 154, link 140, and N_Port 118. Similarly, computer 102 may communicate with computer 104 through a path comprising N_Port 108, link 130, switch 150, link 162, switch 154, link 136 and N_Port 114, or through an alternative path comprising N_Port 108, link 130, switch 150, link 160, switch 152, link 164, switch 154, link 136, and N_Port 114.

Consider the first and second path described above between computer 120 and RAID system 106. In a network utilizing static routing, only one of these paths is active at a given time. The active path may include one or more elements that become overloaded, or become a bottleneck for these communications. For example, if the active path from N_Port 108 of computer 102 to N_Port 114 of computer 104 is through link 162 and the active path from N_Port 122 of computer 120 to N_Port 118 of RAID system 106 is also through link 162, it is possible for link 162 to have a heavy load while link 160 is idle.

There may be multiple processes simultaneously executing on computer 120. Each of these processes 200 and 202 (FIG. 1A) may generate an I/O request 204 and 206 as known in the art, each of which in turn is performed through an exchange 208 and 210 as known in the art. These exchanges may overlap in time as they are transferred by the N_Port 122 to and from the fabric; overlapping I/O operations may result from multiple concurrent processes on a machine and many other known causes. For example but not by way of limitation, a disk write operation and a disk read operation may overlap.

A disk-write command may be packetized as a write exchange FIG. 2A comprising a write command frame 250 sent from the originating N_Port 251 to a receiving N_Port 252, and a write-data sequence 254 sent after a transfer ready frame 255 is received by the originating N_Port 251. When writing to cache or disk has been completed by the receiving N_Port's machine, a response status frame 256 is returned to the originating N_Port 251. Additional acknowledgment and control frames may also be used. Similarly, a disk-read I/O command becomes a read exchange, FIG. 2B, which operates through transmission of at least a read command frame 260 from the originating N_Port 251 to a receiving N_Port 252, which may be associated with a RAID system or other storage device. When data associated with the read operation is ready, the receiving N_Port 252 returns a data sequence 264 and status 266 frames to the originating N_Port 251, which may be associated with a computer. The write exchange of FIG. 2A may overlap the read exchange of FIG. 2B. For example and not by way of limitation, it is possible that the originating port read command 260 may be transmitted by the originating port 251 after the write command frame 250 is transmitted and before the transfer ready frame 255 is received by the originating port 251.

Figure 3:
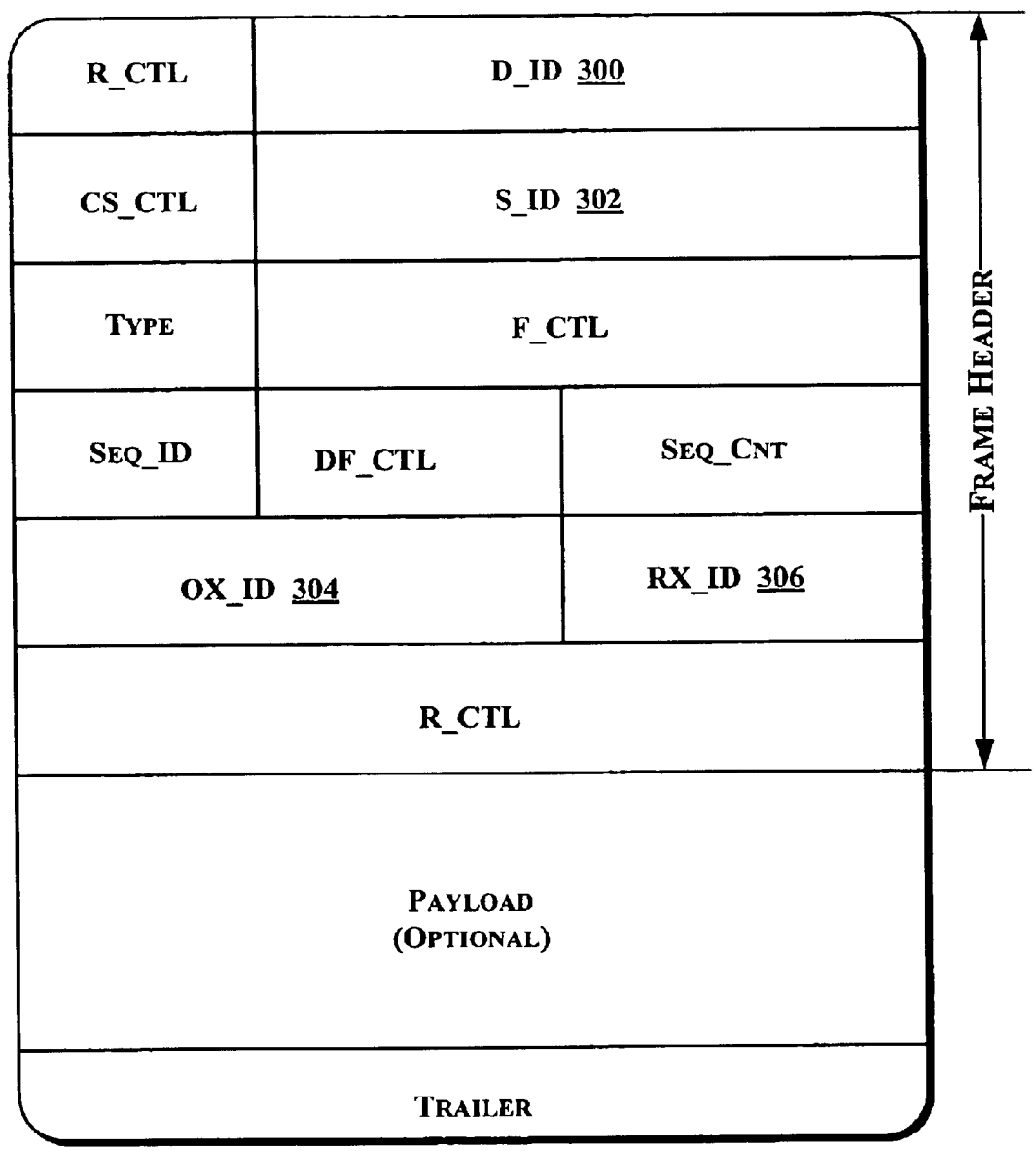
FIG. 3, an illustration of a Fibre Channel frame, as known in the art, detailing header information associated with the frame.

Each frame, or packet, transmitted over a Fibre Channel network has structure as illustrated in FIG. 3. The frame contains a header, an optional payload, and a trailer. The header includes several fields, including a Destination Identification (D_ID) field 300, a Source Identification (S_ID) field 302, an Originator Exchange Identifier (OX_ID) 304, and a Responder Exchange Identifier (RX_ID) 306. The RX_ID 306 may change during an exchange because it is assigned by the responder node after the first frames of an exchange are received by that node; the OX_ID 304 is stable within an exchange. It is possible for a switch to nearly-simultaneously receive frames having identical D_ID 300 and OX_ID 304 fields from different sources, having different S_ID fields 302.

A switch of a Switched Fibre Channel Fabric receives frames having the format of FIG. 3, and typically has multiple switch ports, such as E_Ports 170 and 178 (FIG. 1), and F_Ports 174 and 176 of switch 150. Once the switch 150 receives a frame on an incoming switch port it is expected to forward that frame on a selected outgoing port of the switch. The selected outgoing port is a switch port, other than the incoming switch port, on a path from the originating N_Port to the receiving N_Port.

Figure 3A:
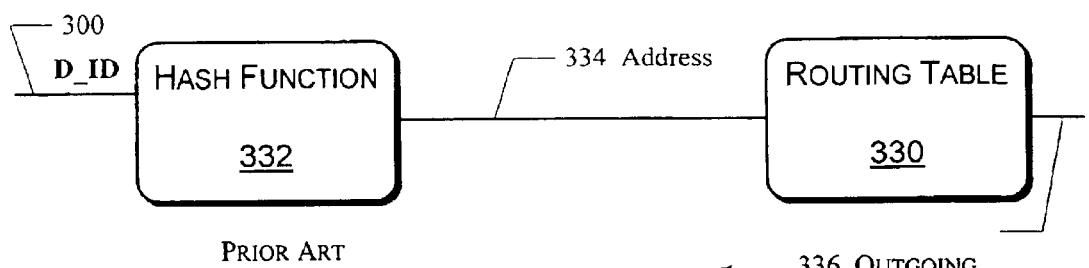
FIG. 3A, an illustration of a prior-art routing table for routing frames based upon D_ID.

It is known that a routing table 330, FIG. 3A indexed by a hash function 332 of the D_ID 300 field of a frame header, may be used to generate an outgoing port selector for controlling the outgoing switch port on which frames are forwarded by the switch. The D_ID 300 field is transformed by a hash-function 332 to an address 334, the address locating a table entry in the table 330. Each entry has an outgoing port selector 336 that controls the switch port on which the frame is forwarded by the switch.

Figure 3B:
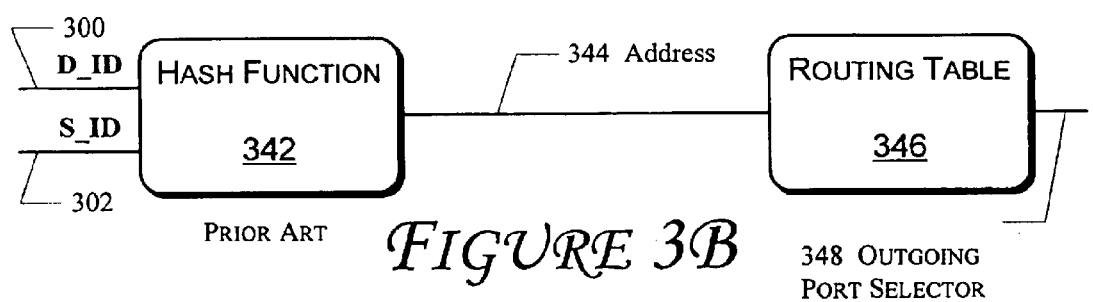
FIG. 3B, an illustration of a prior-art routing table for routing frames based upon S_ID and D_ID.

In an effort to improve the ability of network management software to optimize traffic flow on a network, some switches input the S_ID field 302 (FIG. 3B) of the frame, or an incoming switch port number on which the frame was received, to a hash function 342 in addition to the D_ID field 300. As in the routing system of FIG. 3A, the hash function 342 generates an address 344 that locates a table entry in a routing table 346. The table entry then provides an outgoing port selector 348. This permits the switch to route traffic to a given destination from two different sources over two different routes.

Figure 3C:
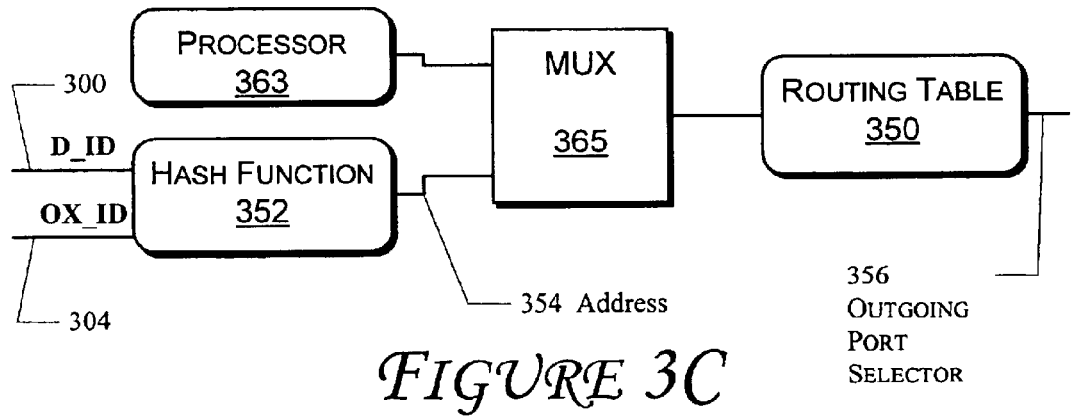
FIG. 3C, an illustration of a routing table of the present invention for routing frames based upon D_ID and OX_ID.

In a switch of the present invention, a routing table 350, FIG. 3C, is indexed by an address 354 generated by a hash function 352 of the D_ID field 300 and the OX_ID field 304 of each frame header. An outgoing port selector 356 is derived from a table entry of the routing table 350 located in the table by the address 354. The outgoing port selector 356 is used to control the switch port on which frames are transmitted.

Figure 3D:
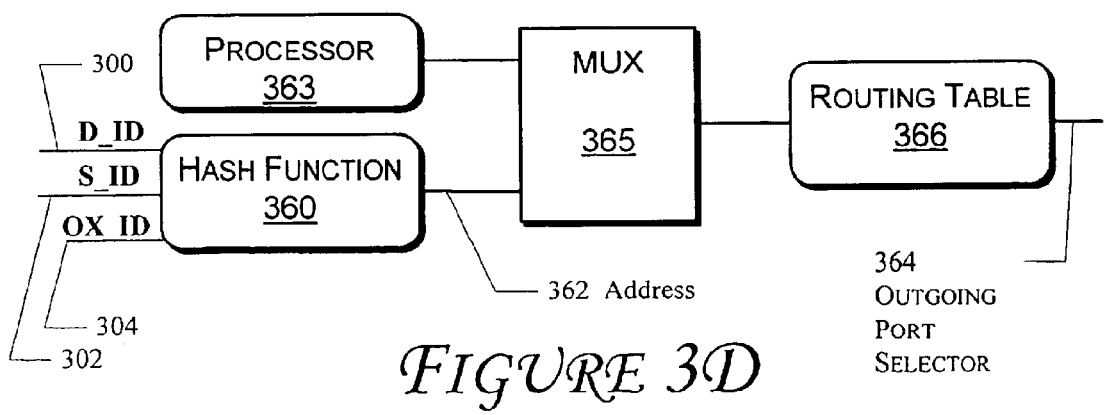
FIG. 3D, an illustration of a routing table of the present invention for routing frames based upon D_ID, OX_ID, and S_ID.

In an alternative embodiment of a switch of the present invention, the S_ID field 302, as well as the D_ID field 300 and the OX_ID field 304, of each frame header is used by a hash function 360 (FIG. 3D) to generate an address 362. Address 362 is then used to generate an outgoing port selector 364 by reading a table entry from a routing table 366. This embodiment provides opportunity to independently control frame distribution between available paths for each source.

Consider frames received by a switch 150 of the present invention from computer 120 and intended for RAID system 106 N_Port 118. The headers of each of these frames are decoded by switch 150. In the network as illustrated, frames having D_ID field 3 corresponding to a destination of N_Port 118 may reach that destination through a path through switches 152 and 154, and through a second path through switch 154 directly. A hash function of the DID field 300 and at least one bit of the OX_ID field 304 of the header are therefore used to index routing table 180 to select the outgoing switch port. The routing table 180 has the structure illustrated in FIGS. 3C and 3D. The hash function is selected such that all entries of the routing table 180 that may be selected by a valid D_ID field 300 correspond to a valid outgoing port on a path to the N_Port identified by D_ID that is distinct from the incoming switch port.

Frames belonging to the same exchange have the same OX_ID field; therefore these frames follow the same route through the network and tend to arrive in-order within that exchange. Frames may, however, arrive out-of-order with respect to frames of other exchanges.

In a Fibre Channel network, there may be paths between two ports that are "better" in some way than others. Multiple bits of the OX_ID field 304 may be considered by a routing table to distribute frames between a preferred and a less preferred path. For example, if three bits of OX_ID are considered by a routing table of switch 150, eight table entries may be addressed for the same D_ID. If three of these have an outgoing port selector specifying E_Port 170, while five specify E_Port 178, about three-eighths of frames will tend to follow the path through switches 150 and 154 while five-eighths of frames will tend to follow the path through switches 150, 152, and 154. If more than one valid path appears in the table for any given destination, exchanges directed to that destination are thus distributed between the paths according to the frequency with which each path appears in the table.

As machines, switches, and links are added to or removed from the network the routing tables are updated to reflect valid paths through the network and the desired frame distribution among them. The routing tables are also adjusted as a load-balancer task, which may run on any compute-capable machine or switch of the network, adjusts demand on elements of the network. For example, should the link 162 attached to E_Port 170 of switch 150 fail, those routing table entries specifying this port may be replaced by entries specifying E_Port 178 so that frames may reach their intended destination.

It is not necessary that the hash function 340 consider all bits of the OX_ID field, it is expected that significant distribution of traffic among multiple routes can be achieved by considering as few as one or several low bits of the OX_ID field.

In an alternative embodiment of the present invention, a hash function 400 (FIG. 4A) of the D_ID field 300 generates an address-X 402 for a two-dimensional routing table 404. A second hash function 406 generates an address-Y 408 for the routing table 404 from the OX_ID field 304 and may also consider the S_ID field 302. The routing table generates a outgoing port selector 410 as previously described. The routing table 404 therefore has a predetermined, number of port entries for each valid D_ID, each entry of which is readily locatable. The set of port entries for a particular D_ID are referenced as a line of the routing table.

Figure 4A:
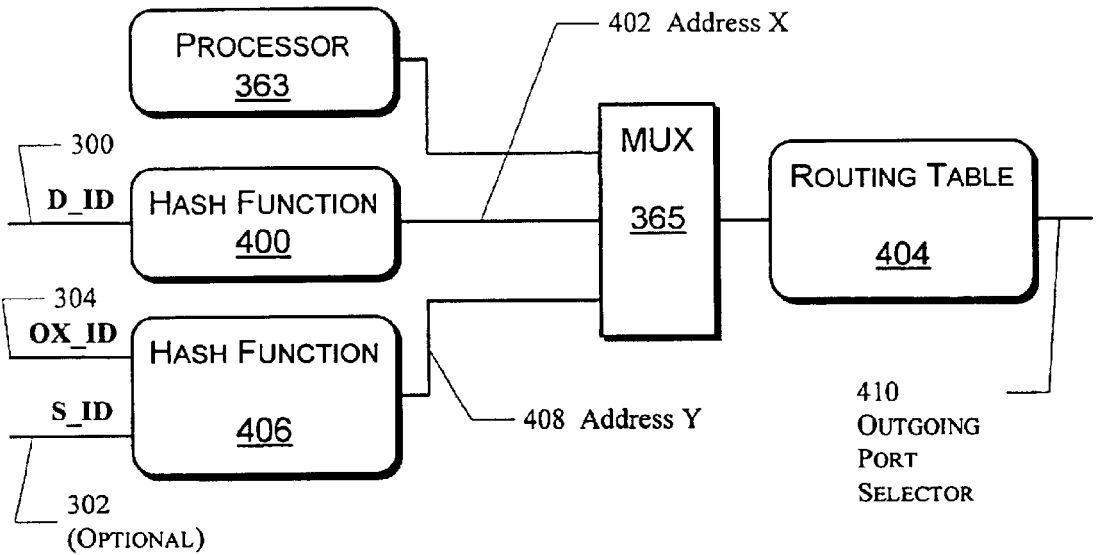
FIG. 4A, an illustration of a routing table system incorporating separate D_ID and OX_ID hash functions ahead of a routing table.

The embodiment of FIG. 4A is advantageous because only one line of the routing table need be rewritten to alter the distribution of frames between paths to an individual N_Port. Further, this embodiment lends itself to control of frame distribution among paths because the number of entries associated with each destination is constant and these entries are readily located in the table.

Figure 4B:
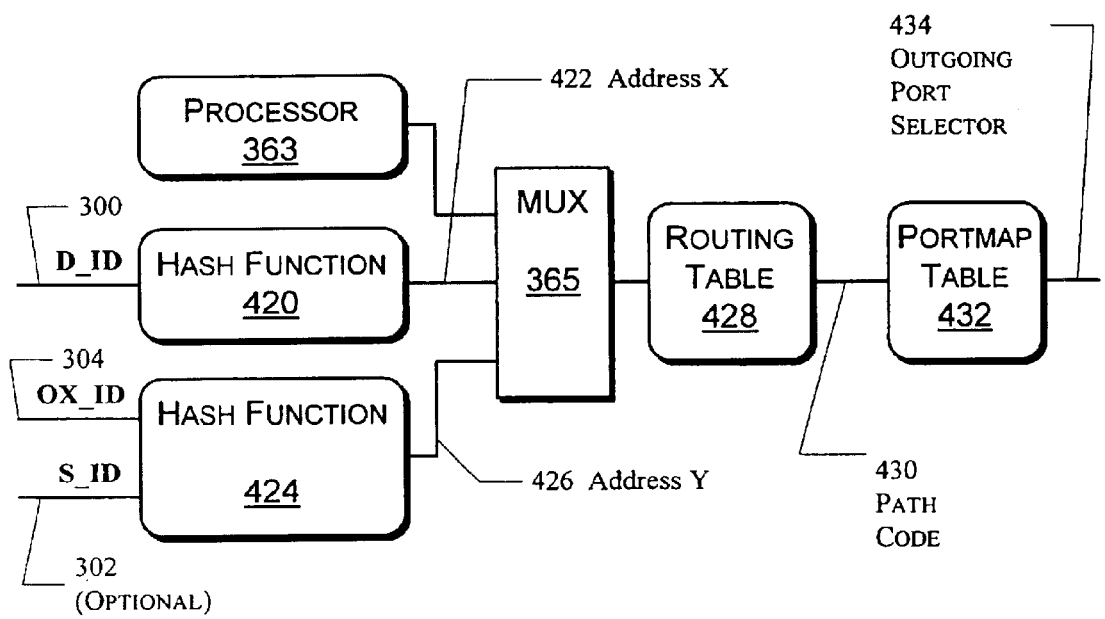
FIG. 4B, an illustration of a routing table system incorporating separate D_ID and OX_ID hash functions ahead of, and a level of indirection after, a base routing table.

While the routing table of the present invention has been described as producing an outgoing port selector from a hash function of the D_ID and OX_ID fields 300 and 304, that operation may be either direct or indirect. In an alternative embodiment, a level of indirection is used such that paths may be taken in or out of service quickly, without need to rewrite many of the outgoing port selectors in the routing table. For example, consider the routing table structure of FIG. 4B. In this embodiment, a hash function 420 of the D_ID field 300 generates an address-X 422. A second hash function 424 of at least one bit of the OX_ID field 304, and, optionally, the S_ID field 302, produces an address-Y 426. The address-X 422 and the address-Y are combined to address a routing table 428. The routing table 428 thereupon produces a path code 430. Path code 430 is then translated by a portmap table 432 into the outgoing port selector 434. Path code 430 may have more bits than outgoing port selector 434.

In this embodiment, should a link fail it may be possible to rewrite the portmap table 432 to reroute all frames onto a functioning link (if one exists) in less time than it would take to restructure the routing table 428. Once the frames are rerouted onto a functioning link by rewriting the portmap table 432, the routing table 428 may be adjusted to balance the load. Alternatively, if path code 430 has more bits than the outgoing port selector 434, it may not be necessary to rewrite the routing table 428.

Routing tables of the present invention may be implemented in firmware or hardware of the switch. It is known that implementation of routing tables in hardware provides advantage for switches having heavy load and large numbers of switch ports. In a hardware implementation, routing table 350 of FIG. 3C, 366 of FIG. 3D, 404 of FIG. 4A, or 428 of FIG. 4B, may be implemented with a static RAM, and the portmap table 432 with a second static RAM. In such an embodiment, the routing table address inputs are multiplexed (365) so it can be written by a processor 363 of the switch such that the processor 363 can maintain the routing table. The routing table is thereby addressable by either the address generated by the hash function or functions, or by an address generated by the processor.

The hash function used for addressing the routing table may be any of many hash functions known in the art of computer science. This function may also comprise concatenation of a preselected group of bits of each input to the hash function; such as concatenation of one or more low-order OX_ID bits with several bits of the D_ID field to produce an index to the routing table. This function may also comprise concatenation of functions of bits from each field, or concatenation of bits of results of a function applied to each field.

A computer program product is a machine-readable memory having recorded on it a program for performing a particular function; this may be a read-only memory or may be an erasable and rewritable memory such as RAM, CD-RW, tape, flash memory, or magnetic disk. It is anticipated that routing control software for controlling routing tables as herein described may be distributed or operated as a computer program product. Similarly, a switch containing firmware for constructing and utilizing the routing table of the present invention in routing frames is expected to contain memory having that firmware, and therefore contains a computer program product.

While much reference has been made to a first and second path through the network, the invention is not limited to a pair of paths. The invention is applicable to any reasonable number of concurrently available paths between nodes of a network.

While the invention has been particularly shown and described with reference to a preferred embodiment thereof, it will be understood by those skilled in the art that various other changes in the form and details may be made without departing from the spirit and scope of the invention.

What is claimed is:

1. A network comprising:
   a network fabric comprising at least two switches and a plurality of links, each link connected to a least one switch of the at least two switches;
   a first N_Port connected to a link of the network fabric;
   a second N_Port connected to a link of the network fabric;
   wherein there exists a first path and a second path from the first N_Port to the second N_Port through the network fabric;
   wherein network traffic in a first direction from the first N_Port to the second N_Port is automatically distributed between the first path and the second path by one of the at least two switches such that frames transmitted in the first direction and related to any single exchange are transmitted over the same path of the first and second paths yet frames transmitted in the first direction and related to different but overlapping exchanges need not follow the same path;
   wherein frames are routed by at least one routing table, the routing table having inputs comprising a hash function of a destination identifier of a frame header and at least one bit of an originator exchange identifier and the hash function further comprises a first hash sub-function of at least one bit of the destination identifier and having an output, a second hash sub-function of the at least one bit of the originator exchange identifier and having an output, and a concatenation operation of the output of the first hash sub-function with the output of the second hash sub-function.

2. The network of claim 1, wherein the frames related to the any single exchange are identified by a switch as belonging to the single exchange through fields of a frame header comprising an originator exchange identifier field.

3. The network of claim 1, wherein the at least one routing table is located within a switch of the at least two switches.

4. The network of claim 1, wherein the network comprises a switched Fibre Channel fabric.

5. The network of claim 1, wherein the hash function has an input further comprising a field selected from the group consisting of a source identifier field of the frame header and an incoming port number on which the frame was received by the switch.

6. The network of claim 1, wherein the routing table produces an index to a second table that provides an outgoing port identifier for the switch.

7. The network of claim 1, wherein a load-balancing task of the network updates the at least one routing table to alter a distribution of exchanges among paths.

8. The network of claim 1, wherein the second hash sub-function is a bit select operation.

9. The network of claim 1, wherein the hash function has inputs further comprising an input selected from the group consisting of an incoming port identifier on which the frame was received and at least one bit of a source identifier field of the frame header.

10. A program product for distributing network traffic between a first N_Port of a network and a second N_Port of a network, the network having a plurality of paths for frames from the first N_Port to the second N_Port and at least one switch, the program product operable upon said switch and comprising computer-readable code for:
    maintaining a routing table, the routing table indexed by an output of a hash function of inputs comprising a destination identification field and an originator exchange identifier field of a header of a frame;
    causing the routing table to be accessed upon receipt of a frame, the routing table coupled to determine a selected port for transmission of the frame; and
    causing the frame to be transmitted on the selected port,
    wherein the hash function further comprises a first hash sub-function of at least one bit of the destination identification field and having an output, a second hash sub-function of at least one bit of the originator exchange identifier field and having an output, and a concatenation operation of the output of the first hash sub-function with the output of the second hash sub-function.

11. The program product of claim 10, wherein the hash function has inputs further comprising an input selected from the group consisting of a source identifier field of the frame header and an identity of a switch port upon which the frame was received.

12. The program product of claim 10, wherein the routing table is coupled to determine a selected port by providing an index to a second table that provides a selected port identifier.

13. A switch for a network capable of distributing frames received on a first port over a plurality of ports, the switch comprising
    a plurality of ports including a first port, the first port capable of receiving a frame;
    a routing table capable of determining a port of the plurality of ports for forwarding a received frame based upon an address;
    a hash function generator capable of generating an address for the routing table based upon information comprising a destination identification field and at least one bit of an originator exchange identifier field of a header of the received frame;
    a processor for maintaining the routing table; and
    apparatus for receiving a frame and for passing a received frame to the port determined by the routing table,
    wherein a hash function provided by the hash function generator comprises a first hash sub-function of at least one bit of the destination identification field and having an output, a second hash sub-function of the at least one bit of the originator exchange identifier field and having an output, and a concatenation operation of the output of the first hash sub-function with the output of the second hash sub-function.

14. The switch of claim 13, wherein the hash function generator is capable of generating an address for the routing table based upon information further comprising an identifier selected from the group consisting of a source identifier field of the header of the received frame and a N_Port identifier of the switch port on which the frame is received.

15. The switch of claim 13, wherein the hash function generator further comprises devices to perform the hash function of destination identification field and at least one bit of an originator exchange identifier field of the header of the received frame, and the routing table comprises a memory capable of being addressed by the address generated by the hash function.

16. The switch of claim 15, wherein the memory of the routing table is implemented by at least one RAM, the RAM being writable by the processor and coupled to be addressed through a multiplexor capable of providing a RAM address from the group of addresses comprising an address generated by the processor and the address generated by the hash function.

* * * * *